United States Patent
Nesper

[11] Patent Number: 5,396,122
[45] Date of Patent: Mar. 7, 1995

[54] DOOR OR PROTECTIVE HOOD LOCKING CONTROL SYSTEM AS A SAFETY DEVICE FOR MACHINES

[75] Inventor: Gerhard Nesper, Oberstenfeld, Germany

[73] Assignee: Elge Elektronik-Geratewerk GmbH & Co., Schopfloch, Germany

[21] Appl. No.: 840,740

[22] Filed: Feb. 25, 1992

[30] Foreign Application Priority Data

Feb. 26, 1991 [DE] Germany .............. 4106009.1

[51] Int. Cl.$^6$ ............................................. H02H 7/08
[52] U.S. Cl. ..................................... 307/326; 307/112; 307/125; 318/626; 70/174; 70/277
[58] Field of Search ............... 307/326, 11, 112, 113, 307/115, 116, 125, 126, 130, 131, 134, 139, 141, 149; 70/57, 77, 91, 174, 262, 275, 277; 318/605, 626, 653, 661

[56] References Cited

U.S. PATENT DOCUMENTS

| | | | |
|---|---|---|---|
| 3,913,413 | 10/1975 | Walker | 74/612 |
| 4,105,903 | 8/1978 | Shaw et al. | 307/328 |
| 4,171,735 | 10/1979 | Zuhlke et al. | 192/134 |
| 4,282,963 | 8/1981 | Kafura et al. | 192/133 |
| 4,434,390 | 2/1984 | Elms | 318/473 |
| 4,453,117 | 6/1984 | Elms et al. | 318/778 |
| 4,456,867 | 6/1984 | Mallick, Jr. et al. | 318/778 |
| 4,467,260 | 8/1984 | Mallick, Jr. et al. | 318/800 |
| 4,476,423 | 10/1984 | Mallick, Jr. et al. | 318/800 |
| 4,717,984 | 1/1988 | Henry et al. | 361/25 |

FOREIGN PATENT DOCUMENTS

| | | |
|---|---|---|
| 9102270 | 7/1991 | Germany . |
| 3900733 | 8/1991 | Germany . |
| 3837218 | 10/1991 | Germany . |
| 4106009 | 8/1992 | Germany . |

OTHER PUBLICATIONS

German article "KEM" Thema des Monats: Schalter und Relais, Sicherheitsrelais–Bausteine bieten verdrahtungssparende Kompaktlösungen, Erst bei Störung schalten, Jan. 1989, pp. 55–56.

Primary Examiner—Jeffrey A. Gaffin
Attorney, Agent, or Firm—Darby & Darby

[57] ABSTRACT

For a door or protective hood locking control system of a safety device with normal or excessive safety for machines, particularly machines carrying out rotational motions, a stoppage monitoring guard is disposed in the current circuit for the door locking mechanism that is operated by push-buttons. This stoppage monitoring guard is taken from a redundant, rotational motion signal evaluating system of the target installation of a rotational motion monitoring device, which is already present, and operates redundantly to monitor each axle with two rotational motion sensors so that a dedicated rotational motion sensing system can be dispensed with for the redundant operation of the door locking system.

13 Claims, 4 Drawing Sheets

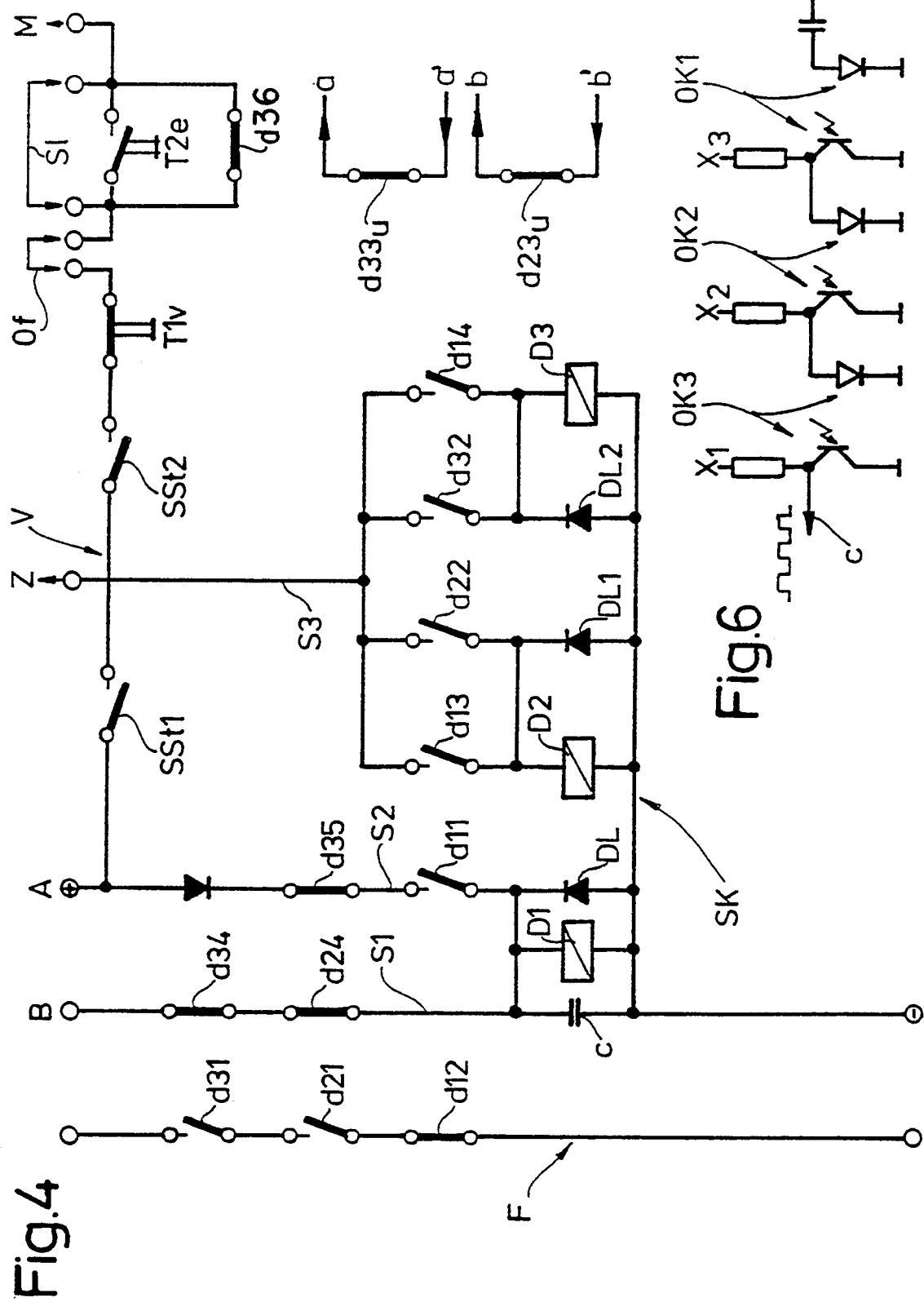

DOOR OR PROTECTIVE HOOD LOCKING CONTROL SYSTEM AS A SAFETY DEVICE FOR MACHINES

BACKGROUND OF THE INVENTION

1. Field of the Invention

The invention relates to a door or protective hood locking control system, which serves as a safety device to protect persons against accidents from automatic motional processes of machines and industrial robots.

2. Discussion of Related Art

Known safety circuits, which also comprise door-monitoring components, are known from an article entitled "Erst bei Störung schalten" (Switch only in the event of a disorder), published in the German publication KEM, January, 1989 on pages 55 to 56.

This article deals with the use of so-called safety relay components which provide compact solutions by saving on wiring and which may be used in the area of protective door monitors and protective door tumblers of machines. Usually such monitoring circuits or tumblers of protective doors serve to protect persons against accidents due to automatic motional processes of machines and installations and also due to industrial robots carrying out certain motional processes. With the increasing complexity of manufacturing processes, such safety circuits for the locking and unlocking of doors or protective hoods can also increasingly serve in machine protection itself against unwanted interruptions of automatic processes. It is possible to differentiate between a plurality of circuits, for example, between the use of two alternately operating monitor switches and the use of two monitoring switches operating in parallel, whose constructions are with or without catches (door tumblers). The locking effect for such door locks is brought about by spring pressure or a magnetic force.

Usually, manually operated push-button switches are used for locking and unlocking doors. Catch magnets may be acted upon as the appropriate current paths become released by further, safety-relevant switches. At the same time, the door position is scanned by an opener or closer which is separate from the locking magnets so as to enable further switching conditions to be derived. Such unlocking or locking circuits for magnets or on some other basis should also contain so-called stoppage monitors in a suitable form, which ensure that unlocking, after which a door or hood can be opened, occurs only when a machine has stopped or at the end of a rotational motion.

Furthermore, protective devices for monitoring creep or rotational motions with normal or increased safety at machines are known from the Offenlegungsschriften 38 37 218 and 39 00 733. The safety circuit, which is described in the German Offenlegungsschrift 39 00 733, relates to a monitoring circuit of modular construction, which, by stringing together additional monitoring circuits, relates also to machines with several axles, which in each case carry out rotational motions.

The safety circuits described in the two German Offenlegungsschriften, 38 37 218 and 39 00 733, are incorporated herein by reference for describing supply of rotational movement signals utilized in a door or protective hood locking control system and for describing their own safety concepts which may be applied to the present invention.

With respect to the usual door-locking control systems for machines, the previously-mentioned stoppage monitors are required. Usually, at least one rotational motion sensor is disposed and serves as a parallel switch or series switch in the locking circuit of the door magnet. The magnet may be activated or the door caused to open only when the stoppage :monitor has established that there is no rotational motion or other motion in the area of the axle that is to be monitored. If such a door locking system is to be constructed redundantly with high safety, then it will require even two such stoppage monitors or stoppage switches, which produce independently of one another the corresponding rotational motion signals and bring them along separate paths into the area of the triggering circuit for the door magnets. This is particularly expensive, since most of the existing security protection circuits for switching off any rotational motion of the machine, for example, over :relay switches in the triggering region of the motors, must anyhow have a system for sensing rotational motions. Under certain circumstances, such a system can also be very expensive.

SUMMARY OF THE INVENTION

One aspect of the invention is directed to a door or protective hood locking control system that enhances safety. The system includes a redundant rotational motion signal evaluation in effecting control and may do without a dedicated, external sensor system for detecting (rotational) motion, including all of the peripheral equipment otherwise required for that purpose.

In accordance with the invention, a door or protective hood control system, including the locking and unlocking systems which operate redundantly with high safety, advantageously is able to connect the required release paths for the operation of the machine and, although it is equipped with a redundant stoppage monitor, does not require any of its own rotational motion sensors.

The inventive system takes stoppage information, which is absolutely necessary for a safety control system, from a rotational motion monitoring device that is present anyhow and can therefore do completely without its own peripheral equipment. The invention therefore results in considerable savings. This desirable feature must be considered together with the advantage that the stoppage monitoring signal obtained is derived and evaluated redundantly. In other words, the same safety is achieved with the inventive system as with high-cost safety-monitoring circuits corresponding to the German Offenlegungsschriften 38 37 218 and 39 00 733 which exemplify the state of the art.

This is also the case if a stoppage signal is derived from only one of the two measuring systems monitoring each axle in duplicate for rotational motion. After all, the two measuring systems, which monitor the rotational motion of each axle in duplicate by means of different encoders or equivalent interrogations, are linked to one another in such a manner, that, at the instant in which one of the signals still detects rotational motion of the axle, the whole of the machine is switched off over an appropriate shutdown trip circuit. An appropriate reaction is communicated in any case also to the (other) measuring system, which is called upon, for example, particularly for transmitting the signal for the stoppage monitor for the door locking system. The redundant safety capability striven for in the case of such a stoppage monitor used for a door or safety hood control system is therefore guaranteed in all areas.

The invention therefore succeeds not only in lowering costs appreciably, but also in simplifying such a door-locking control system, because the appropriate, external peripheral equipment, including the motion sensors, which would otherwise be required, may be omitted completely. Moreover, the whole of the circuit also operates redundantly in the sense of double safety. In the case of previously known door-locking control systems, such a redundant operation would necessarily have required the use of an external scanning system for the motions in duplicate. In contrast, the present invention obtains an advantage by allowing the door-locking control system to borrow this redundancy for the redundant safety devices of the aforementioned publications.

Particularly advantageous in accordance with the invention is the problem-free evaluation of a plurality of machines, which are carrying out rotational movements. In this case, appropriate, individual stoppage signals are derived from the different measuring systems belonging to the respective axles and, connected in series, are taken actively as far as the triggering circuit for the magnetic locking of a door or a protective hood.

The locking control systems for several protective hoods may be designed according to the invention in the form of a cascading of the individual contacts.

BRIEF DESCRIPTION OF THE DRAWINGS

For a better understanding of the present invention, reference is made to the following description and accompanying drawings, while the scope of the invention is set forth in the appended claims. The drawings show, as a representative of all conceivable embodiments of triggers and switch levers on any electrical equipment, particularly hand-held electrical equipment, a trigger of an electronic switch, which is constructed as an accelerator switch with switching-on function, with a further lever above the trigger for switching over between right and left, in side view and partially in sectional view.

FIG. 4 shows a schematic wiring diagram of another possible embodiment of a safety relay combination, which also contains a release circuit and the manual triggering circuit (assenting contact circuit) for the door hood locking and unlocking system.

FIG. 6 shows a schematic wiring diagram of a further embodiment of the derivation of the stoppage monitoring signal, when more than one axle is to be monitored for rotational or other movement.

DESCRIPTION OF THE PREFERRED EMBODIMENT

Figure 1:
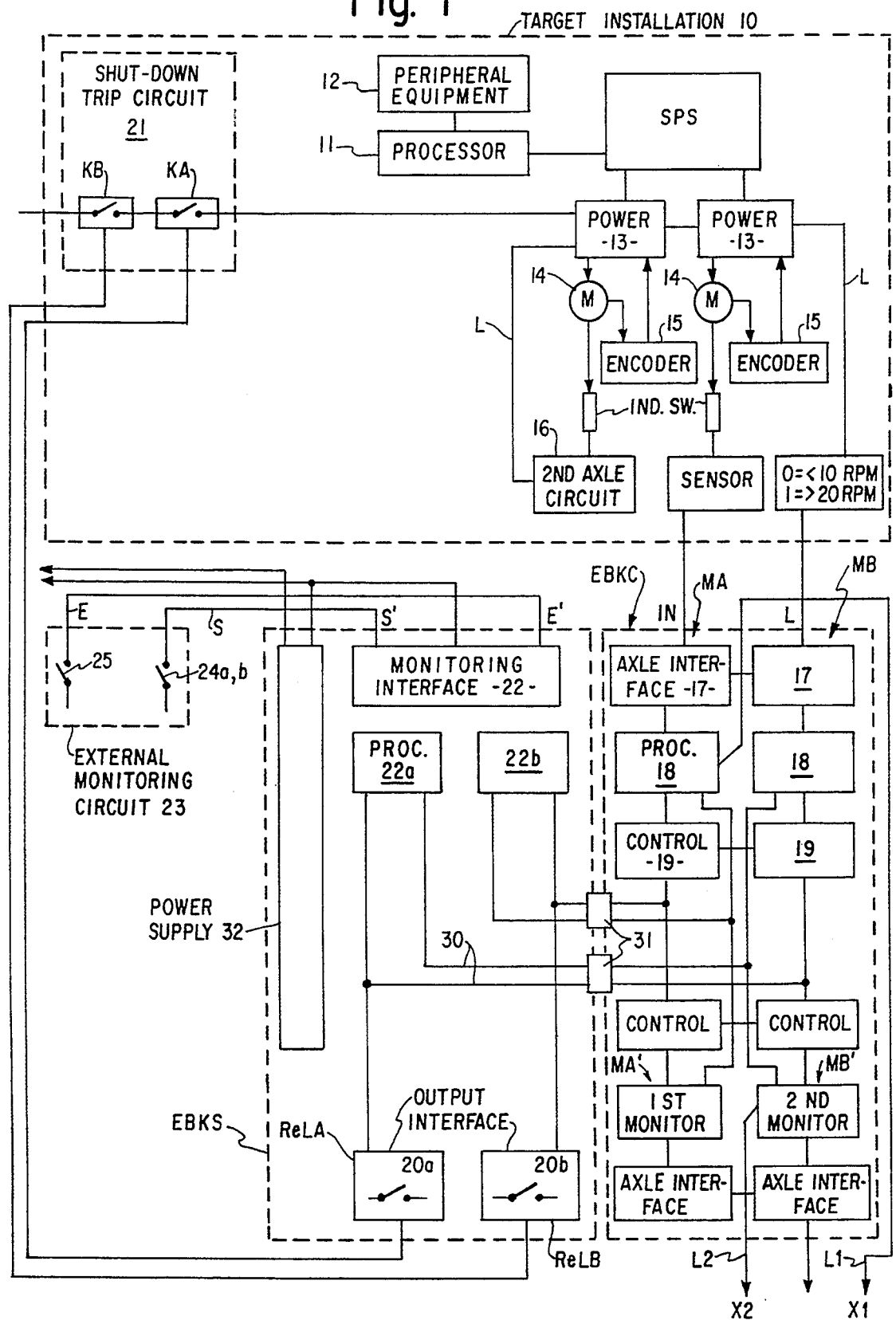
FIG. 1 shows a schematic circuit diagram of a known monitoring system for rotational motion with two axle circuit monitors in the form of a block circuit diagram, which corresponds to FIG. 1 of the German Offenlegungsschrift 39 00 733. This figure also shows the addition of lines L1 and L2 which provide stoppage monitor signals to the door locking system as part of the present invention.

In order to place the invention into a technically understandable context, some basic facts of known rotation monitoring systems corresponding to the German patent 39 00 733, in which, depending on the number of axles to be monitored, a modular construction of the monitoring circuits is provided, are dealt with in greater detail on the basis of the representation of FIG. 1. Lines L1 and L2 are not part of the prior art device, but rather constitute an element of the present invention by providing signals X1 and X2 as described below.

In FIG. 1, the machine to be monitored, as a target installation 10, is not within the area of the rotation monitoring circuit shown in this Figure. Without going into details, the machine includes a suitable processor or control section 11 and peripheral equipment 12 assigned to the control sections 11 and power parts 13. The power parts are triggered by the processor and, through check-back signals, make possible a controlled operation of the moving unit 14, for example an electric motor, which is triggered by the power part.

The initial rotational motions of the electric motors are to be monitored by the embodiment of the invention shown. The electric motors may be, for example, the driving motors of the spindles of a lathe, a mortise machine, a robot, etc.

Basically, the nature and construction of the target installation are arbitrary. For each axle circuit of this installation, a power part 13 is provided. The power-current of each power part is supplied over a shut-down trip circuit region 21, which is acted upon by the output circuit of the power supply unit belonging to the basic unit. The shutdown trip circuit region 21 comprises two shut-down trip circuits KB and KA, which are connected in series, and which are acted upon in each case by dedicated output interface circuits 20a, 20b of the power supply unit EBKS.

To monitor the movement or rotational motion of each axle circuit, two different, but also varying motion sensors also referred to as encoders may be provided. Preferably, only one external rotational motion transmitter 15 is assigned to each axle circuit, that is, to each spindle, and referred to as signal IN, which is proportional to the rotational motion. Meanwhile, a confirmation signal, which ensures the redundant function of the axle circuit, is derived as signal L from the respective power part 13 for the corresponding axle circuit and is applied to the respective axle circuit function block 16.

Each EBKC control unit or EBKU monitoring unit not shown may process two independent axle circuit signal data, so that, as shown in FIG. 1, a monitoring system, which consists of a basic unit, may carry out two separate axle circuit monitoring processes. The EBKU unit is identical to the KBKC unit and functions to monitor another axle. Thus, each additional axle may have its own associated EBKU unit as explained in applicant's corresponding application filed Jul. 15, 1991, Ser. No. 07/730,201.

The encoders used scan the rotational motion performed by the respective output shaft in a convenient manner. For example, they are optical, inductive or capacitive proximity switches or transmitters. Hall generators, incremental angular motion transducers, magnetic field plate proximity switches, etc. also come into consideration.

The two relevant output signals per moving axle reach the monitoring-measuring system assigned to them, namely MA, MB for the first axle circuit and MA', MB' for the second axle circuit, over their corresponding device inputs IN or L.

Each of the measuring systems rates the incoming rotational movement signals IN and L with respect to limited, specified values. For each relevant rotational signal, each measuring system may comprise an axle interface 17, a processor unit 18 connected at the output side and a regulating or controlling circuit 19. The processor unit 18 is connected to the regulating or controlling circuit 19, whose output signals (in each EBKC control unit or supplementary EBKU monitoring units, which have, accordingly, four control circuits) reach over cross connection lines 30 and over plug contact connectors, which are between the lines 30, to the output interface circuits 20a, 20b, which serve to trigger the shut-down trip circuit control.

Supplementary to the output interface circuits 20a, 20b and aside from a power supply unit 32 for generally supplying power to the EBKC units or to further EBKC units connected, for example, by means of plug contacts, a common power supply unit, EBKS, has at its disposal a common monitoring interface 22. Processors 22a, 22b are responsible for the signal evaluation including generation of output signals thereby performing the whole electrical work of each unit- not to be considered as a processor in PC for digital CPU.

An external monitoring circuit 23 comprises one or preferably two separate door contact circuits 24a, 24b, as well as an assenting or second contact circuit 25, which, as a push-button circuit, opens up again at the conclusion of manual actuation by an operator. Circuit 25 performs agreement to effect a limited movement.

For protective ,devices with normal safety, the monitoring circuit 23 contains only one door contact circuit (as shown in FIG. 1) in the form of a forcibly interrupting switch, the output signal S of which is supplied to the input S' of the monitoring interface 22. The signal E of the assenting contact circuit (forcibly interrupting switch 25) is applied to the input E' of the monitoring interface.

With regard to the output circuit control by the power supply unit EBKS, it should still be mentioned that output switching relays Rel A and Rel B, which energize the series circuit of the shut-down trip circuit in each case to tile power parts 13 of the target installation, are assigned to the output interface circuits 20a, 20b.

While the above-described known safety circuit redundantly monitors motions or rotational motions; the invention is conceived as an expansion of the basic unit comprising the power supply unit EBKS (in German, Elge Bewegung Kontrolle Stromversogung) and an associated control unit EBKC (in German, Elge Bewegung Kontrolle Controlleinheit) or monitoring unit EBKU (in German, Elge Bewegung Kontrolle Ueberwachungseinheit). The invention relates to the area, which is not disclosed further in the known publications, namely, that of the redundant door or protective hood locking system.

Figure 2:
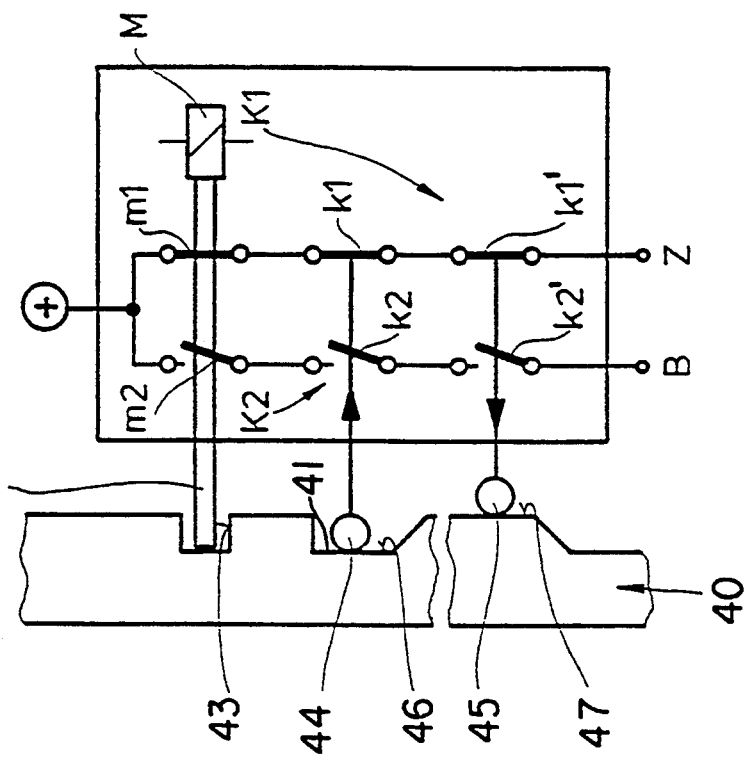
FIG. 2 shows a schematic wiring diagram of an embodiment of tappet-operated contact switches in conjunction with a locking magnet of a door locking system in accordance with the invention.

In FIG. 2, a part of a door or protective hood 40 is indicated schematically; this part may also be a guide rib, a rail or a different part of a door, with a specially constructed cam profile 41. As in the case of the embodiment shown here, the tappet elongation 42 of a locking magnet M may engage a suitable recess 43 of the door in order to lock the door, while the cam followers 44, 45, which operate the switching contacts k1, k2 or k1', k2', can be activated by associated cam surfaces 46, 47 of the door rail. For the sake of simplicity, only a door or a door locking system is discussed throughout in the following description; however, any safety hood facilities are intended to be covered by the invention.

The locking of the door, that is, the locking by the locking magnets M is accomplished in the currentless state of these magnets (spring-actuated locking); the other switching contacts are there to provide status data.

Two different, parallel, electric circuits K1 and K2 connect the output connection points (which are connected to the safety relay combination of FIG. 4), depending on the position of the protective hood and the switching position of the switching contacts m1 and m2, which are controlled by the locking magnet M, with the supply voltage.

FIG. 4 shows the safety relay combination having different electric circuits, namely, a release path F, an actual safety relay combination SK consisting of the relays D1, D2 and D3, and an unlocking and locking current path V as a manual, assenting circuit for the door unlocking and locking system by way of the locking magnets M.

The first relay D1 is connected to two different electric circuits, a first electric circuit S1, which comprises the series connection of two relay contacts d24 and d34 (these are switched by the sister relays D2 and D3, which are provided in duplicate for greater safety), and a second electric circuit S2, in series with a relay switching contact d35 and a dedicated self-holding switching contact d11. A quench diode DL, as well as a capacitor C can also be connected in parallel to the relay D1. At its connecting point A, the electric circuit S2 is constantly connected with a positive supply voltage, while the S1 electric circuit is connected with the door electric circuit K2.

For a clearer understanding, all relay contacts or switches are shown in the deenergized position of the corresponding relays D1, D2 and D3, except for the stoppage relay contacts SSt1 and SSt2, which function as a stoppage monitoring guard.

The relays D2 and D3 are in the supply current path K1 for the door circuit (connection point Z). They are identical in circuit and structure, connected in parallel and have in their circuit S3 coming from the connecting point Z their own self-holding contacts d22 and d32. The contacts d13 and d14, which are switched by the relay D1, are parallel to the self-holding contacts of d22 and d32. Here also, quench diodes DL1 and DL2 may be provided parallel to the relay windings.

The basic function of the system as a whole is then as follows and the following switching phases arise:
Phase I It is assumed that the rotational motions of the machines have stopped, so that, and this will be dealt with later on, the two stoppage monitoring switching contacts SSt1 and SSt2, which are present redundantly, close. There is a closed current path from the supply connection point A to the locking magnet M, even if the unlocking pushbutton T2e is operated. By this closed pathway, the unlocking magnet M in FIG. 2 is supplied with current. Magnet M opens its switching contact m1 and closes m2, so that, as will be dealt with later, the current path K1 to the connecting point Z opens, the relay D3 (and D2) drops out and, in the then currentless state, closes its parallel contact d36 to the unlocking push-button T2e. A sort of self-holding circuit results for the locking magnet M.

If the hood then opens, the door status contacts k1, k1' and k2, k2' change their respective switching position and the current path K2 closes completely and applies supply voltage to the connection point B.

Phase II

Thereupon relay D1 operates, because, since the contact point Z is currentless, the series contacts d34 and d24 are closed. Relay D1 closes its self-holding contact d11 in the S2 circuit, opens d12 in the general release path, so that (with the door now open), a plurality of locking functions can become active in the machine area in the peripheral equipment or elsewhere. It is unnecessary to go into this further.

Moreover, this first relay D1 closes its relay contacts d13 and d14 and, by these means, closes electric circuits in preparation for the later connection of the relays D2 and D3.

During this phase II, any work can be undertaken on the machine with the door or protective hood open. As a result of the currentless state of the relays D2 and D3, relay contacts D33u and D23u, which are also only indicated in FIG. 4, are closed. As will be dealt with later on by means of the discussion of FIG. 5, these relay contacts D33u and D23u prevent a constant back and forth switching of relays, such as the switching of the stoppage monitoring relays SSt1 and SSt2 and, with that, also of the locking magnets. This has application, for example, where adjusting work including creep motions up to specified limiting values is to be carried out on the machine with the hood open.

Phase III

The operator closes the door at a convenient time, so that the status contacts k1 and k1' close and operate a locking push-button Tlv in order to interrupt the current supply circuit V for the unlocking magnets M. This current supply was maintained until now by the closed relay contact d36. By these means, the locking magnet M becomes currentless and also closes its contact m1.

As a result of opening the switching contacts k2 and k2' in the current path K2, the current circuit S1 has previously switched to the currentless state, while the relay D1 continues to be supplied over a self-holding contact d11 in the parallel current circuit S2.

As soon as the current circuit K1 supplies voltage to the connection point Z due to the switched-over locking magnets, the relays D2 and D3 are supplied with current over the switch contacts d13 and 14, which are still held closed by relay D1 and close their own self-holding contacts d22 and d32. At the same time, the switching contact d35 is opened by way of its relay D3 and the first relay D1 is finally deenergized. This means that the relay contact d12 (from relay D1) closes in the release circuit. At the same time, the two relay contacts d21 and d31 also close in the release circuit, so that this circuit is now activated. At the same time, the switching contacts d36 (parallel to the unlocking push-button), which are controlled by the relay D3, as well as the stoppage suppression contacts d33u and d23u, open. up.

The machine can then be started (release path is switched), whereupon the stoppage indicator contacts SSt1 and SSt2 open as the rotational motion commences.

Returning to FIG. 1, it can be seen that the stoppage evaluation signals—for example, from the switching states of bistable elements—are redundant for each axle and may be obtained in each case in the area of the processor 18 of each measuring system. Additional connecting lines L1, L2 have therefore been provided, which are connected with a relevant switching element in the area of the processor, perhaps by a flipflop showing a corresponding switching state, so that status signals X1, X2, X3 . . . arise at the outputs of the lines L1 and L2 and make available information about the rotational motion behavior of each axle, which information is inherently redundant and, therefore, provides for the necessary safety.

As agreed, a signal X1, X2 . . . , which is elevated upon stoppage of the rotational motion detected, is detected in the area of the processor. For each axle, only one such signal X1 or X2 or X3 is required and the corresponding signal of only one of the two processors of each measuring system, responsible for each axle, is scanned. For the assured redundancy, this is possible because these signals, as a result of the design of the axle circuit rotation monitoring system, are anyhow redundant, upon appropriate linkage of the two measuring systems MA and MB for each axle circuit monitoring system among one another and because of the redundant shut-down behavior in the event of interruption.

Figure 5:
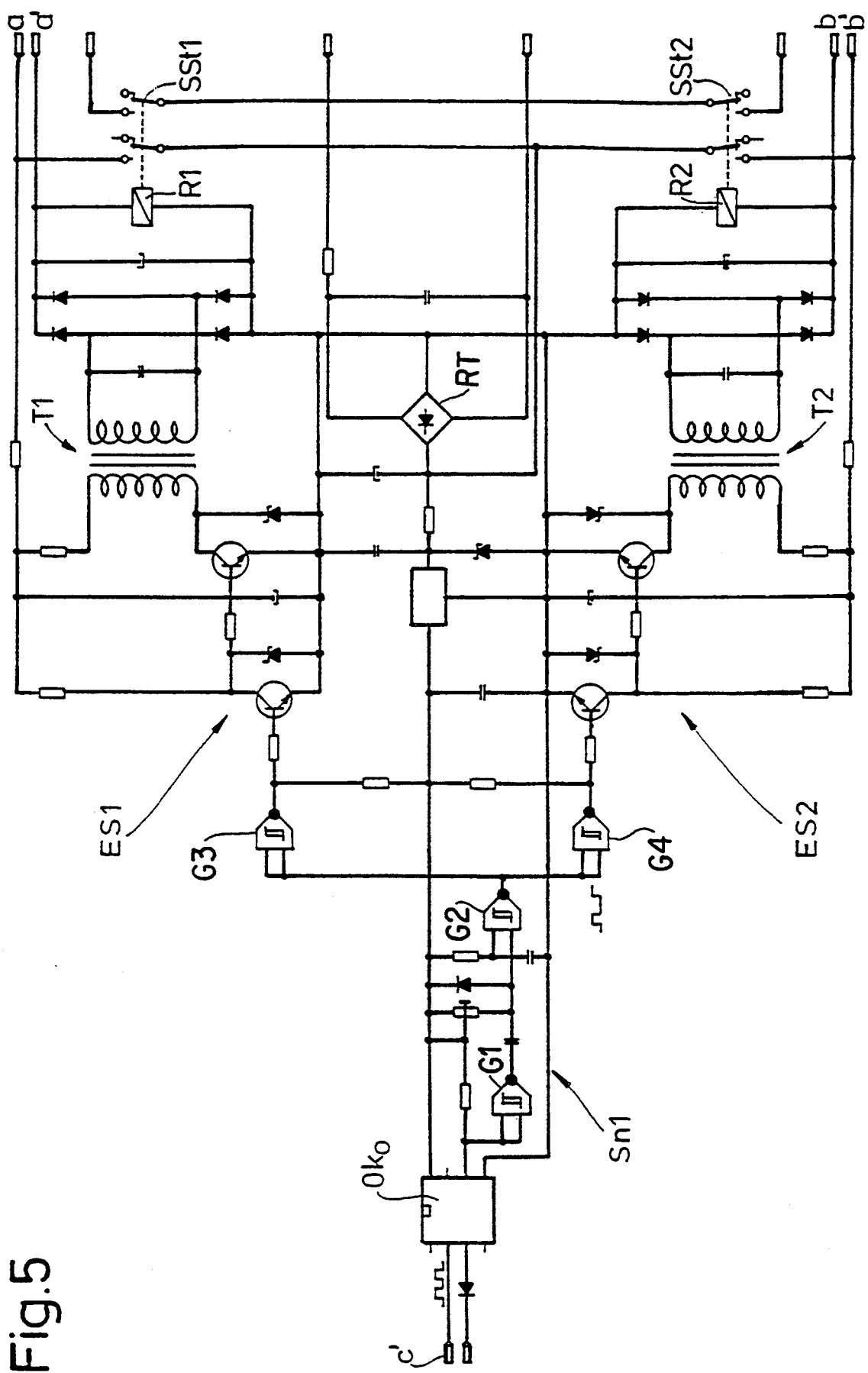
FIG. 5 shows a schematic wiring diagram for obtaining a redundant relay circuit signal for stoppage monitoring from the cumulative stoppage message of the respective axle circuit monitoring systems with output relay contacts in the manual, assenting contact circuit, for maintaining the necessary redundancy also in this area.

Since often several axles have to be monitored, there are several such stoppage indicating signals X1, X2 . . . ; if there is only one, axle, there is also only one such signal, which is fed to the circuit of FIG. 5 for further processing or passing through the safety processing circuit of FIG. 6, if several signals X1, X2, . . . are present. It is a question of optocouplers/amplifier stages OK1, OK2, OK3 . . . , which are connected in series and correspond in number to the number of axles that are to be monitored. The stoppage indication signals X1, X2, X3, which are elevated upon stoppage of the monitored axles, in each case are connected with the collectors of the phototransistors of the optocouplers (through resistances). By these means, the corresponding transistors and, with that, also the optocouplers are switched to the active state, so that a medium frequency input voltage, such as a square-wave voltage RS (for example, about 2750 Hz—the actual value is not critical) reaches the output C of such a series circuit. It can be seen that an interruption in the transmission current path for the medium frequency signal voltage RS occurs whenever there is no stoppage indicator signal, since in this case there is no supply voltage to the corresponding phototransistors.

The signal frequency then reaches the input C' (FIG. 5) of a handling and processing circuit for the stoppage indicator signals. After galvanic separation over an optocoupler OKo, the dynamic stoppage indicator signal is prepared in subsequent steps Sn1, so that a clean square-wave course results. It is then divided up and conducted for triggering output relays over respective dynamic output stages ES1, ES2 with inclusion of isolating transformers T1, T2. Output relays R1, R2, which switch the stoppage monitor switching contacts SSt1 and SSt2, which were already mentioned in FIG.

4 and are shown once again in FIG. 5, are connected in series with the transformers. The division into two output relays R1 and R2, which are triggered by the initially single-channel, dynamic stoppage indicator signal, takes place here to maintain the redundant safety, since relays participate in the circuit structure at this place.

A corresponding double-channel guidance of also the dynamic stoppage indicator signal in the area of FIG. 6 is not required, since a malfunction would always only lead to the failure of this signal. In the absence of any triggering of the relays R1, R2, the consequence of such a failure would be that the stoppage monitor switching contacts SSt1 and SSt2 (FIG. 4) cannot be closed and therefore the hood also cannot be unlocked. In this circuit area of the optocoupler-series circuit OK1, OK2 . . . , the safety is given by the dynamic signal guidance. FIG. 5 also shows gates G1, G2, G3 and G4 which are used for performing pulse shaping. The voltage controller of FIG. 5 operates preferably from 24 volts supply to 12 volts. Also identified is a rectifier RT.

It is important to consider that, with the hood open in a setting-up phase, motion can occasionally occur and be followed once again by stoppage, etc.. As a result, the locking magnet would constantly be attracted and drop off once again (circuit point Z in FIG. 4 is not supplied with current because of the contact configuration of FIG. 2 with the hood open), so that relay contacts d36, d33u and d33u are closed. This will be discussed below.

The connections a, a' or b, b' of these two switching contacts are connected with appropriately labeled input connections on the right-hand side of FIG. 5, so that a stoppage suppression results when the hood is open by virtue of the fact that an energizing of the output relays R1 and R2 is suppressed by this through-connection of the connections a, a' or b, b' in FIG. 5. In other words, the stoppage monitoring is suppressed when the hood is open and under appropriate setting-up conditions.

The safety relay combination of the relays D1, D2 and D3 is self-controlling and therefore operates with excessive reliability. For example, the operation of the relay D1 (phase I), which responds first, over the electric circuit S1, which is supplied with current when the hood is open, is possible only if the two relays D2 and D3 are in working order, that is, hold the normally open contacts d34 and d24 closed. If this is not the case, D1 cannot be energized.

If the locking and unlocking push-buttons T1v and T2e are installed directly on the equipment, appropriate further push-buttons, which are indicated by the bridges Of and S1, can also be provided elsewhere; these fulfill the same task; bridge Of is an opener contact and bridge S1 is a closer contact.

Security relay D1 has a self-holding contact d11 in series with break contact D35 of one of the other relays D2 or D3 and is connected with constant supply voltage A (see FIG. 6). Further, D1 has make contacts d13 and d14 in the respective parallel circuits to D2 and D3 which are commonly connected with supply line S3 and activated in case the door is closed and arresting magnet M is dropped-out.

It is also possible to delay the stoppage signal transmission temporarily by means of appropriate delay circuits, for example, by 400 ms, to mention a numerical value here, which of course does not limit the inventive scope, so as to ensure in any case that the stoppage monitor contacts SSt1 and SSt2 close only when it can be established with certainty that there no longer is any motion of the monitored axles.

Figure 3:
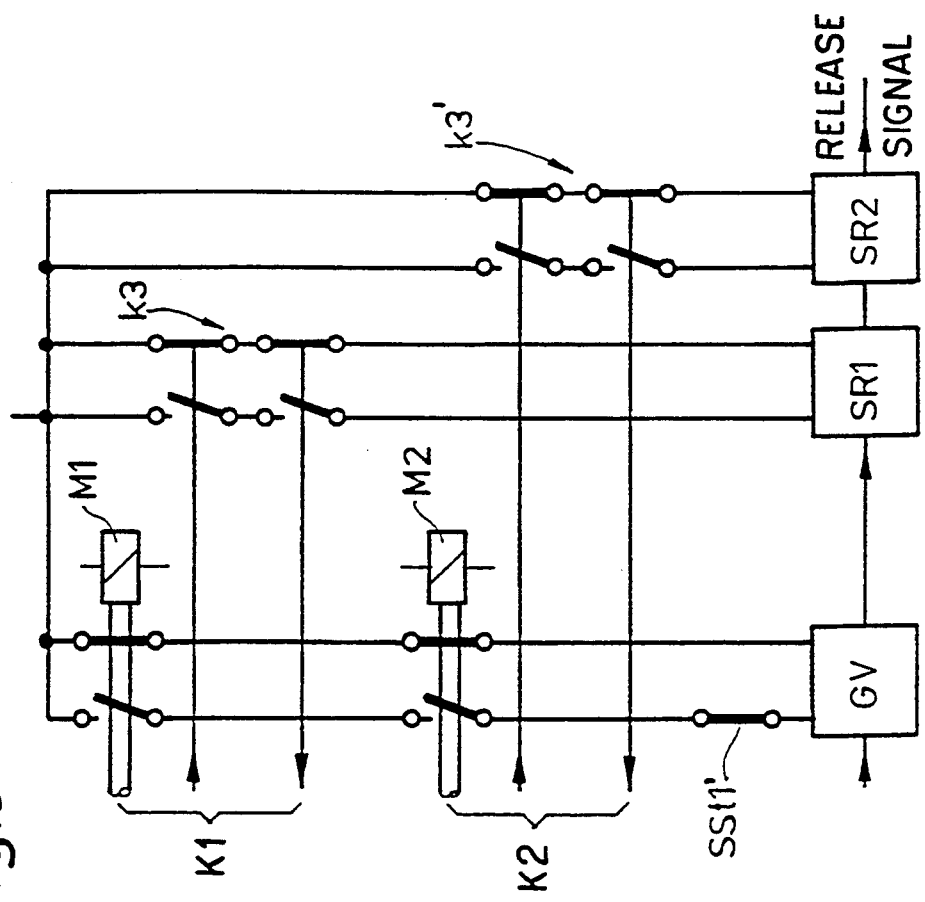
FIG. 3 shows a schematic wiring diagram of a cascade circuit of the respective contacts and the associated locking magnets, when more than one protective door or protective hood is present.

The invention may also be used when more than one protective hood, for example, two, three or more mutually independent hoods, locked or unlocked, must be monitored. From FIG. 3, it may be inferred that in this case the contacts forming the current paths K1 and K2 are divided so that contacts, switched by the locking magnets M1, M2, operate in series on a total locking block GV. The contacts k3 or k3', which are, for example operated by tappets and supply the door status signals, are taken out of the series circuit with the locking magnet-controlled contacts and connected in parallel to their own safety relay combination circuits SR1, SR2, which then process the status signals of the respective protective hood 1, protective hood 2, etc., and can, for example, be constructed, in the same way as the safety relay combination SK of FIG. 4. Due to the cascading of the circuit blocks GV, SR1 and SR2 . . . , an appropriate release signal then arises for the cases, in which more than one protective door is present. Over each safety relay component, required in each case for one protective hood, a release path is obtained, which, when connected in series, bring about the release as a whole.

To sum up, only upon stoppage of all the axles monitored, are the safety relays, which are internal to the circuit, activated. This process is carried out only if the contact states of the relays are free from faults. Only then is the unlocking circuit released over the external unlocking push-button T2e.

By connecting the safety relay combination SK, the stoppage evaluation is eliminated for the function mode of creep operation with motion.

Over appropriate, relevant contacts, including the stoppage evaluation, the locking unit signals the following states:

the safety hood is closed and the locking system is activated or the safety hood is opened after unlocking.

These modes of functioning are evaluated by the safety relay combination so that the release path for further external driving (such as motion release) is activated by the appropriate release of the stoppage evaluation by the dynamic signal processing over the supply voltage X1, X2,. . . at the optocoupler chain or the release path F is not activated; at the same time, the stoppage evaluation is then switched off by the short circuits over the stoppage interruption contacts d33u and d23u.

The irritating switching on and off of the locking system can be prevented by this latter measure. The release path can be activated only if the contact function of the locking system and of the safety relay combination is free from flaws.

While the foregoing description and drawings represent the preferred embodiments of the invention, it will be understood that various changes and modifications may be made without departing from the spirit and scope of the present invention.

What is claimed is:

1. A door locking control apparatus for the safe operation of a machine having at least one rotational element, a door frame, and a door movable between a closed and an open position to provide access to said at least one rotational element, comprising:

stop means for sensing stoppage in rotational motion of the rotational element, said stop means including at least two independent rotational motion sensors for generating respective stop signals when said rotational element has stopped;

shut down means for selectively allowing and blocking driving energy to rotate the rotational element and responsive to said stop signals for blocking driving energy; and lock means connected with the door and door frame for locking and unlocking the door and responsive to said stop means signals for unlocking the door so that both said shut down means and said lock means are responsive to the same stop signals;

said lock means including a door contact circuit and a second contact circuit operable manually by an operator, the second contact circuit including a locking mechanism corresponding to the lock means.

2. An apparatus as in claim 1, wherein the stop means includes means for sensing rotational motion of a plurality of rotational elements of the machine.

3. An apparatus as in claim 1, wherein the stop means includes at least one stoppage monitoring guard that is movable between positions in dependence upon whether the stop means senses stoppage in the rotational motion of the rotational element.

4. An apparatus as in claim 1, wherein the second contact circuit contains at least one manually operated door-unlocking push-button and at least one manually operated door-locking push-button the stop means including two stoppage monitoring guards disposed in the form of relay contacts, the stop means including means for producing at least one stoppage signal emitted in response to sensing stoppage of the rotational motion of the rotational element, the stop means including output relays which trigger jointly in response to receipt of the at least one stoppage signal.

5. An apparatus as in claim 1, further comprising a basic logic function mode for determining limiting values, the stop means including two measuring systems each monitoring a rotational motion function of the machine which constitutes a target installation and being acted upon by a respective sensor which detects the rotational motion of the target installation at least indirectly, the two measuring systems being linked with one another so that each deviation of the rotational motion from the limiting values leads to an immediate switching off of the driving energy for the target installation.

6. An apparatus of claim 1, wherein the stop means includes output switching relays, the stop means including two measuring systems for monitoring the rotational motion of the rotational elements of the machine, the evaluating means including optocouplers, which are connected to one another in series and amplify a dynamic control signal for forming a dynamic stoppage cumulative message signal, which, after processing, division and galvanic separation, triggers the output switching relays, the output switching relays having two stoppage message monitoring guard contacts, which are connected in series in the assent contact circuit and which close in the event of sensing stoppage and which respond to the presence of the dynamic stoppage cumulative message signal so as to cause the evaluating means to elevate a signal indicative of stoppage when the rotational element is stopped, the second contact circuit also including a manual push-button in a series connection for a locking magnet forming the locking means, the optocouplers being supplied with a current-supplying signal in response to the elevation of the signal when the rotational element is stopped and which is derived from only one of the two measuring systems.

7. An apparatus as in claim 1, further comprising means for supplying current to current paths, which differ depending on whether one or several doors or protective hoods to access the machine, are open or closed, the current paths acting upon relays of a safety relay combination differently, the combination having output relay switching contacts which connect a general release path as well as dedicated self-holding contacts in a respective one of the current paths.

8. An apparatus as in claim 1, wherein the lock means includes a spring locking system and a locking magnet, which locks the door or the hood in the currentless state by a spring locking system, the stop means including status switching contacts comprising corresponding opener contacts and closer contacts, at least one opener and one closer which are connected in series with the corresponding opener contacts and closer contacts of the status switching contacts, the locking magnet connecting the at least one opener and one closer, the opener and closer being tappet-switched by an operating system of the door or hood, in such a manner, that, depending on a switching state of the locking magnet as well as on an open or closed state of the door or hood, form different supply current paths, the paths having output connections which carry voltage either in the closed state or in the opened state of the door or hood.

9. An apparatus as in claim 8, wherein the stop means includes sister safety relays that have openers, the current path carrying a current when the door or hood is in the opened state and when the locking magnets are supplied with current, a first of the three sister safety relays being connected in series with the openers of the two other sister safety relays, the first safety relay having an opener in a release path.

10. An apparatus as in claim 9, wherein the first safety relay has a self-holding contact in series with another opener of another of the two other sister safety relays to which may be supplied a constant supply voltage, further comprising a current carrying supply circuit for the other two sister safety relays which contains switching contacts in parallel that cooperate with each other jointly in the closed state of the door or hood with the locking magnets (M) dropped for allowing current flow to the two sister safety relays.

11. An apparatus as in claim 9, wherein the two sister safety relays have opener contacts as short-circuiting switches for output relays for suppressing stoppage status signal fluctuations, which arise during creep motions of the machine and lead to switching motions of the locking magnets.

12. An apparatus as in claim 1, wherein the sister safety relays have closer contacts that are supplied with current in the normal operation, when the door is closed and locked by the locking magnets being in a dropped position, and lie in the release path.

13. An apparatus as in claim 1, wherein in the case of more than one protective door, contacts, which are switched to close by the respective locking magnets and in each case are assigned and connected in series, are combined into a total locking system, while the door status contacts of the protective hoods, which are present in each case, are controlled separately by safety relay circuits, the total locking system also having an adjoining series circuit with the safety relay circuits, which are connected in series, for producing a common release signal, further comprising at least one addition relay contact, which is switched by the output relays being disposed in the current path formed by the series circuit of the contacts of the respective locking magnets of the locking magnet closing contacts when closed.

* * * * *